May 6, 1969    J. R. METZ    3,442,541
RELEASABLE FASTENER
Filed Nov. 25, 1966    Sheet 1 of 2
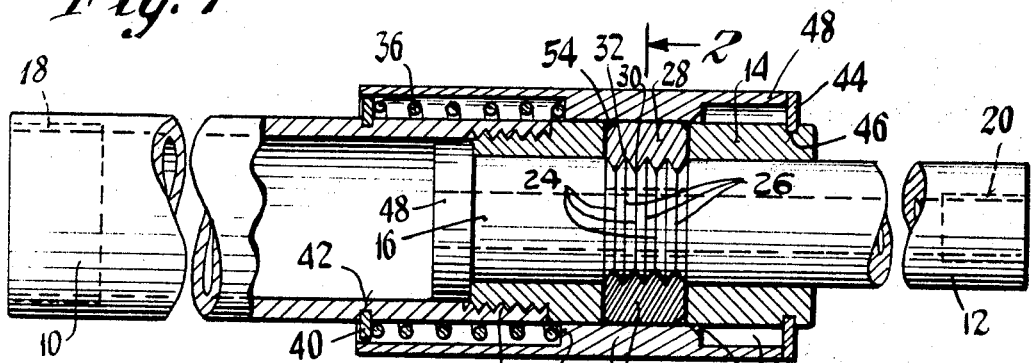
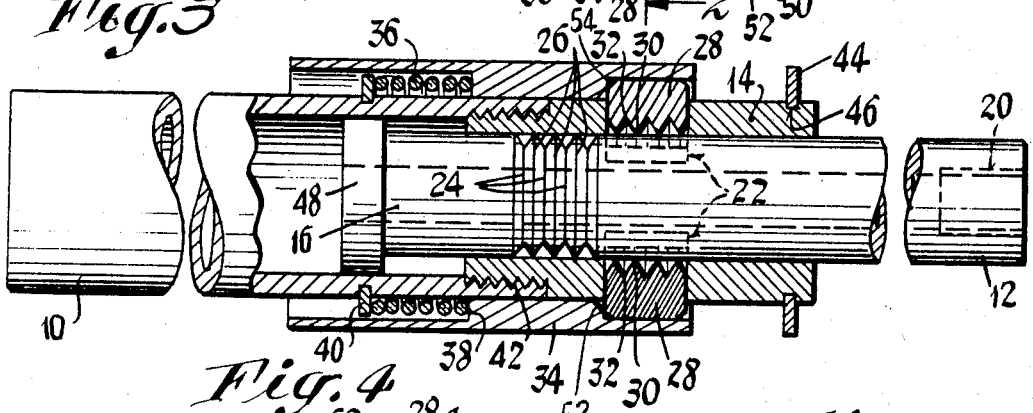
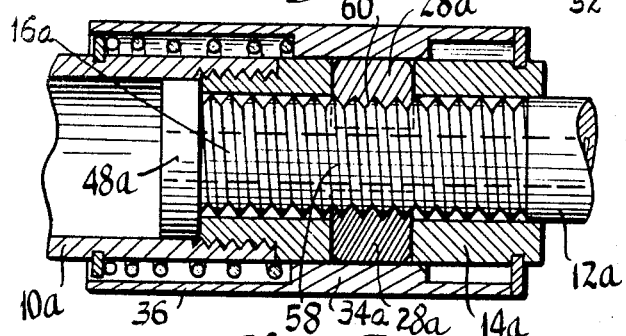
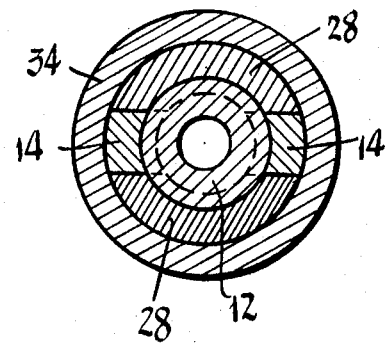
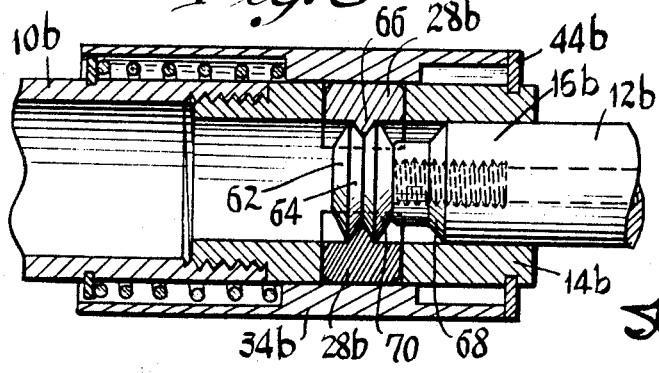
INVENTOR.
Joseph R. Metz
BY
H. Gilmer Lehmann
AGENT

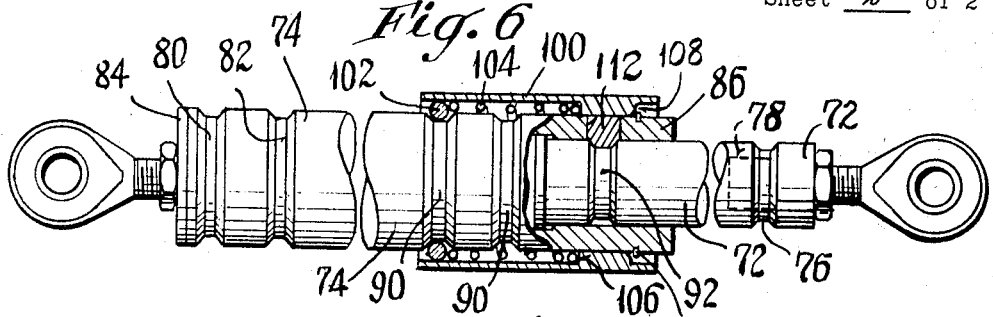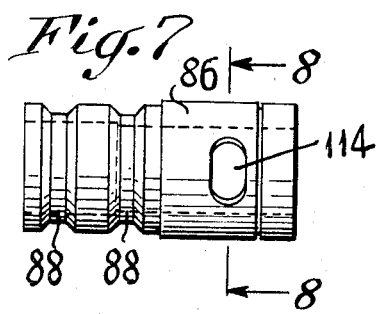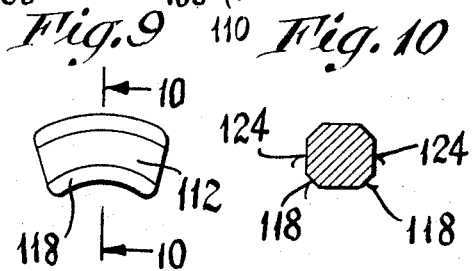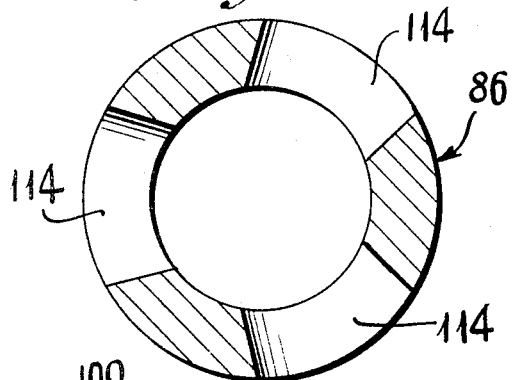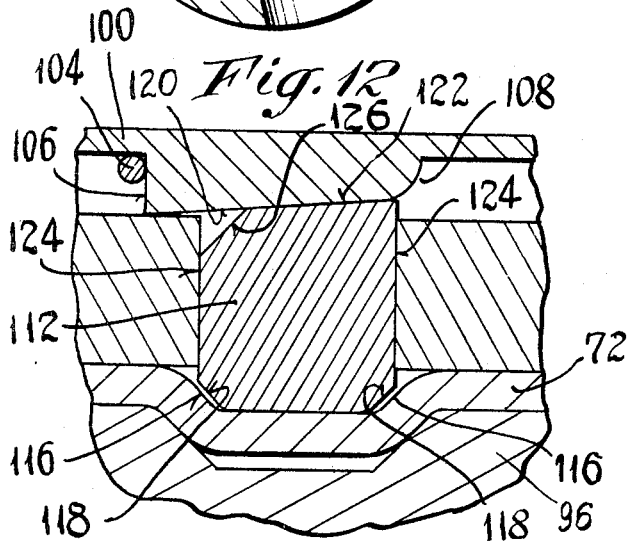

United States Patent Office 3,442,541
Patented May 6, 1969

3,442,541
RELEASABLE FASTENER
Joseph R. Metz, Ridgefield, Conn., assignor to Norco, Inc., Ridgefield, Conn., a corporation of Connecticut
Filed Nov. 25, 1966, Ser. No. 597,064
Int. Cl. F16d *1/00;* F16l *21/00, 55/00*
U.S. Cl. 287—119                                 1 Claim

ABSTRACT OF THE DISCLOSURE

A separable fastener comprising inner and outer tubular telescoping members and a locking dog which can lock the members to each other. The dog is disposed in a slot of the outer member, and is receivable in a notch of the inner member to effect the locking. A spring-biased slidable sleeve on the outer member retains the dog in locking position, or else frees it for movement out of the notch, thereby freeing the inner member.

---

This invention relates to releasable fastening devices, and more particularly to fasteners of the type having interfitting inner and outer cooperable members arranged to be releasably secured to each other.

Prior extensible and retractable struts commonly utilized a conventional locking means to secure the strut in its various desired settings, comprising a split locking collar and a thumb screw adapted to tighten or loosen the split collar, thereby to enable the outer strut member to grip the inner strut member for locking the members to each other. Such prior arrangement had an advantage in that the two strut members would be secured to each other in any of a large number of relative telescoping positions. However, in circumstances where it was only necessary to secure the members in one given extended position, the use of the split collar and thumb screw represented a somewhat time-consuming operation which could also be troublesome. For example, the screw threads could strip, or become corroded so that the thumb screw was difficult to turn or else inoperative. Also, the arrangement was inconvenient since it required a certain amount of manipulative skill, and in addition the tightening and loosening of the thumb screw was time-consuming.

The above drawbacks and disadvantages of these prior extensible and retractable locking strut constructions are obviated by the present invention, and one object of the invention is to provide an improved, simplified extensible single-position locking type strut which is not subject to stripping or malfunctioning of thumb screws and the like, or failure of similar components and which in addition may be very quickly operated, to either lock the strut in its extended position or else unlock and collapse the strut. This is accomplished by the provision of two telescoping strut members the outer of which has slots carrying locking dogs which are receivable in a locking recess of the inner member. A spring-biased slidable sleeve on the outer member retains the dogs in the locking positions, or else frees the dogs for movement out of the recess, thereby freeing the inner member. The outer and inner members have unyielding cooperable shoulders which engage each other when the strut is extended, thereby to substantially precisely locate the locking dogs in alignment with the cooperable recess, whereby the dogs may extend deeply into the recess, to provide an effective locking action.

Other objects of the invention are to provide an improved releasable fastener which is easy to lock and to release, particularly simple yet rugged, reliable and foolproof in its operation, and positive-acting in securing together the associated members, to provide a fastener as above, which has a powerful holding action and great strength before failure, which involves relatively few parts and which is easy to assemble and economical to manufacture, and is especially adaptable for use in an extensible strut construction; to provide an improved fastener of the kind indicated, which is small and compact, and wherein the working parts are largely enclosed, especially when the fastening function is in effect; and to provide an improved fastener in accordance with the foregoing, which may be readily serviced, replaced in part, and repaired in the event it is damaged for some environmental reason.

Other features and advantages will hereinafter appear.

In the drawings:

FIG. 1 is an axial sectional view of a releasable fastener device incorporated in an adjustable strut as provided by the invention, the strut being shown in extended and locked position.

FIG. 2 is a transverse section taken on the line 2—2 of FIG. 1.

FIG. 3 is a view like that of FIG. 1, but showing the fastener released and the strut ready to be fully extended.

FIG. 4 is a fragmentary axial sectional view of a fastener incorporated in an adjustable strut constituting another embodiment of the invention.

FIG. 5 is a fragmentary axial sectional view of a fastener incorporated in an adjustable strut, constituting yet another embodiment of the invention.

FIG. 6 is a fragmentary axial sectional view of a fastener constituting yet another embodiment of the invention.

FIG. 7 is a side elevational view of an end piece of the outer strut member of FIG. 6.

FIG. 8 is a section on line 8—8 of FIG. 7.

FIG. 9 is a side elevation of a locking dog as employed in the structure of FIG. 6.

FIG. 10 is a section on line 10—10 of FIG. 9.

FIG. 11 is a fragmentary side elevation of the locking end of the inner strut member of FIG. 6.

FIG. 12 is a greatly enlarged fragmentary axial section through a portion of the locking assemblage of the strut of FIG. 6.

FIGS. 6 through 12 all relate to the same.

Referring first to FIGS. 1–3, the fastener and adjustable strut illustrated therein comprises outer and inner tubular telescoping members or structures 10, 12 respectively, said members or structures being slidable on each other to bring one set of ends 14, 16 thereof respectively in proximity with each other when the strut is extended as in FIG. 1. The telescoping members 10, 12 have attachment means at their remote ends, comprising screw threads 18, 20 for securing the members to structural parts (not shown) whose relative positions are to be controlled or varied.

In accordance with the invention, the outer member 10 has, adjacent its first-mentioned end 14, a pair of oppositely disposed slots 22, the inner member 12 has adjacent its said first mentioned end 16 an annular recessed locking portion comprising a plurality of grooves 24 separated by ribs 26. The invention further provides a pair of arcuate locking dogs 28 disposed in the slots 22 of the outer member and having means comprising ribs 30 and grooves 32 on their inner peripheral portions, which are engageable with the said locking portions 24, 26 of the inner member 12 to restrain longitudinal movement of the latter.

For cooperation with the locking dogs 28 there is provided a locking sleeve 34 which is slidably mounted on the outer member 10 and which encloses the pairs of slots 22 and also the locking dogs 28. The locking sleeve 34 is movable between a locking position illustrated in FIG. 1 wherein it blocks said locking dogs to prevent outward movement thereof (and thereby maintain the dogs engaged with the locking portion 24, 26 of the inner member), and a releasing position illustrated in FIG. 3 wherein it frees the dogs for outward movement and disengagement from the said locking portion 24, 26.

The locking sleeve 34 is biased to the locking position illustrated in FIG. 1 by means of a helical compression spring 36 encircling the outer telescoping member 10 and at one end engaging an internal shoulder 38 of the sleeve 34. The other end of the spring 36 engages a split washer 40 which is carried in an annular groove 42 in the exterior surface of the outer strut member 10. The locking sleeve 34 bears on the exterior of the split washer 40, as well as on the exterior of the end 14 of the outer strut member 10.

Preferably the end 14 of the outer strut member 10 is constituted as a separate piece which is secured to the remainder of the strut by screw threads 42 as shown. The end piece 14 has a stop in the form of a split washer 44 carried in a groove 46, said washer being abutted by the end portion 48 of the locking sleeve 34 as illustrated in FIG. 1.

The inner telescoping strut member 12 has, at its end 16, an annular shoulder piece 48 for engagement with the inner end of the part 14 of the outer strut member 10, thereby to constitute a stop which prevents complete withdrawal of the inner member 12 when the strut is being extended to the position of FIG. 1.

Also, the shoulder piece 48 is so located that it disposes the locking dogs 28 in substantially precise alignment with the cooperable recess portions 24 of the inner member 12 when the strut is extended. Accordingly, there is never any misalignment of the locking dogs, and instead the detent portions thereof may deeply occupy the recesses 24 to provide an effective locking action between the outer and inner strut members.

Operation of the fastener and the adjustable strut may now be readily understood. Considering first FIG. 1, it will be seen that the strut members 10, 12 are locked against relative movement by virtue of the engagement between the locking dogs 28 and the locking portions 24, 26 of the inner member 12, the said dogs being prevented from having radial outward movement by virtue of the blocking of the dogs by the locking sleeve 34. When it is desired to release the strut and collapse the same, the locking sleeve 34 is grasped and moved from right to left, compressing the spring 36. At the time that the clearance portion 50 of the locking sleeve is positioned adjacent the locking dogs 28 the latter will have clearance, and may now shift outwardly so as to be disengaged from the portion 24, 26 of the inner strut member 12.

The outward movement of the dogs 28 is effected by a camming action, by virtue of the sloping surfaces of the cooperable ribs 26 and 30. The releasing position is shown in FIG. 3, and the inner strut member 12 may now be shifted longitudinally with respect to the outer strut member 10 by virtue of its being disengaged by the dogs 28. The releasing force (from right to left) on the locking sleeve 34 may be discontinued, and the said sleeve will be prevented from returning to the locking position by virtue of the engagement of a camming edge or sloped internal shoulder 52 thereof with camming edges 54 at the side faces of the dogs 28 as in FIG. 3.

When the strut is to be extended and locked in the extended position, the members 10, 12 are merely pulled apart. As the locking portion 24, 26 of the inner strut member 12 reaches the position shown in FIG. 1, the locking dogs will be cammed inward and thereafter locked to the inner member by virtue of the cooperable camming edges 52, 54 respectively on the sleeve 34 and the locking dogs 28, and the spring action on the sleeve 34.

Another embodiment of the invention is illustrated in FIG. 4, wherein similar parts have been given like reference numerals but with added suffixes comprising letters.

In FIG. 4, the locking portion of the inner telescoping member 12a comprises conventional V-shaped screw threads 58 which are cooperable with matching screw threads 60 of the locking dogs 28a. The operation of the strut shown in FIG. 4 is similar to that already described. Under some circumstances it may be easier to externally thread the inner tubular strut member, and to provide the locking dogs with screw threads as in FIG. 4 instead of with the arrangement shown in FIG. 1.

Yet another embodiment of the invention is illustrated in FIG. 5. Here the inner telescoping strut member 12b is provided with a headed stud 62 having an annular V-groove 64 formed with sloping sides. The locking dogs 28b each have a single locking rib 66 provided with sloping sides, and the inner strut member 12b has an annular camming shoulder 68. An opposite camming shoulder 70 is provided on the headed stud 62, said camming shoulders and sloping surfaces being effective to cam outward the locking dogs 28b upon the occasion of their release by movement of the locking sleeve 34b from right to left.

Yet another embodiment of the invention is illustrated in FIGS. 6 through 12, wherein an adjustable strut structure is depicted, which is characterized by great strength and a powerful holding action. In these figures the inner and outer strut members 72, 74 respectively are secured to the associated fittings or end pieces by annular rolled-in portions which occupy annular grooves in the said fittings. The inner strut member 72 has a rolled-in portion 76 by which it is secured to an end fitting 78, and the outer strut member 74 has a pair of rolled-in portions 80, 82 by which it is secured to an end fitting 84. The associated fastening device comprises a tubular end piece 86 having a pair of annular grooves 88 (FIGS. 7 and 8) which accommodate rolled-in potrions 90 of the outer strut member 74.

The inner strut member 72 has a rolled-in portion 92 (FIG. 11) which is received in an annular groove 94 of a stop fitting 96 having an end flange 98.

The locking device further comprises a longitudinally movable locking sleeve 100 riding on the end fitting 86 and also on a split ring 102 engaged by the return spring 104 for the sleeve 100. The spring 104 engages an internal shoulder 106 of the locking sleeve, said sleeve having a camming shoulder 108 which engages a retaining ring 110 carried in a suitable groove in the end fitting 86. By such construction, the locking sleeve 100 is normally retained in the locking position shown in FIG. 6, and may be shifted against the action of the spring 104 from right to left, to effect release of the strut, as with the previous embodiments.

By the present invention, arcuate locking dogs are provided, said dogs being preferably formed from extruded metal stock which has been bent into a curvilinear shape. The locking dogs 112 are carried in recesses 114 of the end piece 86, see FIGS. 7 and 8. As shown in FIG. 6, the dogs 112 are arranged to be received in the locking groove 92 of the inner strut member 72, said groove having opposite sloping walls or shoulders 116 and the dog having cooperable beveled edges 118 engageable with said shoulders.

The locking dogs 112 are maintained in the groove 92 when the locking sleeve 100 is in the position shown in FIG. 6, and are released for outward movement under the camming action of the shoulders 116 and bevels 118 when the sleeve 100 has been shifted from right to left, to the releasing position. As shown in FIG. 12, the locking sleeve 100 has a conical inner surface 120, and the cooperable outer surfaces 122 of the locking dogs are developed as conic areas whereby the sleeve cams inward the locking dogs to provide a tight assemblage characterized by freedom from looseness and by a powerful force retaining the dogs in their locking positions. In consequence, the strut structure is able to withstand strong forces without failure of the locking or fastening device. Each of the locking dogs has relatively large arcuate surfaces 124 which are engageable with relatively large surfaces of the recesses or slots 114 of the end piece 86.

In consequence of this there is no likelihood of crushing of these surfaces under severe working stresses. Moreover, by the provision of the rolled-in portions 90 and 92 of the outer and inner strut members great strength since no cutting of these members has taken place, and no material has been removed therefrom. Accordingly, there is no loss in the wall strength of the strut members 72, 74. In conjunction with the relatively large arcuate surfaces of the locking dogs, the rolled-in construction of the strut members also results in great strength of the entire strut assemblage. It will be noted that the shoulder 108 is cooperable with the beveled surfaces 126 of the locking dogs 112 to cam these inward when the locking sleeve 100 is shifting from its releasing position toward the locking position shown in FIG. 6.

It will now be understood from the foregoing that I have provided improved and simplified fastener devices and adjustable strut structures characterized by simple, straight-forward constructions with relatively few parts. The fastener devices of the struts are effective in their operation and reliable, being not likely to fail under severe stresses, yet release of the locking mechanisms can be easily and quickly effected by merely applying a releasing force to the locking sleeves to shift the same to their released positions. The struts are self-locking when extended from the collapsed position since the action of the springs on the locking sleeves (tending to return the same to the locking position) results in the locking dogs being cammed inward as soon as they are permitted to have such movement by the positioning of the inner members in the fully extended position. With the embodiment of FIG. 4, the inner strut member may have a relatively extensive threaded locking portion whereby the strut may be locked in a large number of different relative adjusted positions.

All of the improved struts of this invention will take tension or compression loading in any locked position and in either direction.

I claim:
1. An extensible and retractable, locking strut construction comprising, in combination:
   (a) a pair of inner and outer, elongate telescoping members which are slidable one within the other to bring cooperable ends thereof in proximity when the strut is axially extended, said members having means at their remaining, remote ends for attachment respectively to structural parts whose relative positions are to be controlled.
   (b) said outer member having in its walls adjacent the said cooperable end thereof a pair of oppositely disposed through slots,
   (c) said inner member having, adjacent the said cooperable end thereof, an outer annular coaxial locking recess forming a pair of spaced-apart annular shoulders in its outer surface,
   (d) a pair of arcuate locking dogs disposed in the slots of the outer member, said dogs having inner peripheral portions adapted to closely fit into opposite portions of said locking recess of the inner member against the shoulders thereof to restrain movement of the inner member when the strut is axially extended and the cooperable ends are juxtaposed,
   (e) a locking sleeve slidably mounted on the outer member and enclosing said pair of slots and locking dogs,
   (f) said sleeve being movable between a locking position wherein it blocks said locking dogs to prevent their outward movement from the locking recess, and a releasing position wherein it frees the dogs for radially outward movement and for disengagement from said locking recess and shoulders thereof,
   (g) spring means located within and biasing the locking sleeve to said locking position,
   (h) said outer member having a rigid internal annular shoulder adjacent the slots thereof,
   (i) said inner member having a rigid outer shoulder at its said cooperable end, engageable with the internal shoulder of the outer member when the strut is axially extended,
   (j) said shoulders being so located that, when engaged, they align the locking dogs with the locking recess to enable the dogs to deeply occupy the recess for locking the strut in extended position.

References Cited

UNITED STATES PATENTS

| 2,680,636 | 6/1954 | Griffin | 287—119 |
| 3,071,188 | 1/1963 | Raulins | 285—34 X |
| 3,252,721 | 5/1966 | Weasler | 287—119 |
| 3,291,442 | 12/1966 | Cranage | 285—34 X |

CARL W. TOMLIN, *Primary Examiner.*

D. W. AROLA, *Assistant Examiner.*

U.S. Cl. X.R.
285—24, 86, 317